US008812149B2

(12) United States Patent
Doak

(10) Patent No.: US 8,812,149 B2
(45) Date of Patent: Aug. 19, 2014

(54) SEQUENTIAL SCANNING OF MULTIPLE WAVELENGTHS

(75) Inventor: Arthur G. Doak, Nashville, TN (US)

(73) Assignee: MSS, Inc., Nashville, TN (US)

( * ) Notice: Subject to any disclaimer, the term of this patent is extended or adjusted under 35 U.S.C. 154(b) by 728 days.

(21) Appl. No.: 13/034,188

(22) Filed: Feb. 24, 2011

(65) Prior Publication Data

US 2012/0221142 A1 Aug. 30, 2012

(51) Int. Cl.
*G06F 7/00* (2006.01)
*B07C 5/342* (2006.01)

(52) U.S. Cl.
CPC .................................... *B07C 5/342* (2013.01)
USPC ........... 700/223; 209/522; 209/581; 209/546; 209/576; 209/587

(58) Field of Classification Search
USPC .......................................................... 700/223
See application file for complete search history.

(56) References Cited

U.S. PATENT DOCUMENTS

| | | | | |
|---|---|---|---|---|
| 2,812,447 A | | 11/1957 | MacMartin et al. | |
| 3,135,867 A | | 6/1964 | Daneff | |
| 3,373,869 A | | 3/1968 | Burson, Jr. | |
| 3,509,349 A | | 4/1970 | Molines et al. | |
| 3,549,263 A | | 12/1970 | Osawa et al. | |
| 3,619,028 A | * | 11/1971 | Keene et al. | 359/220.1 |
| 3,658,428 A | | 4/1972 | Voigtlaender-Tetzner | |
| 3,708,666 A | | 1/1973 | Barhydt | |
| 3,746,421 A | | 7/1973 | Yoder | |
| 3,797,943 A | | 3/1974 | Nagao et al. | |
| 3,866,038 A | | 2/1975 | Korth | |
| 3,973,825 A | | 8/1976 | Starkweather | |
| 4,013,367 A | | 3/1977 | Nagao et al. | |
| 4,041,322 A | | 8/1977 | Hayosh et al. | |

(Continued)

FOREIGN PATENT DOCUMENTS

| | | |
|---|---|---|
| DE | 3242447 A1 | 5/1984 |
| DE | 3346129 A1 | 7/1985 |

(Continued)

OTHER PUBLICATIONS

International Search Report dated Jun. 15, 2012, in corresponding International Application No. PCT/US12/24981, 2 pp.

(Continued)

*Primary Examiner* — Gene Crawford
*Assistant Examiner* — Kyle Logan
(74) *Attorney, Agent, or Firm* — Waddey & Patterson, P.C.; Lucian Wayne Beavers

(57) ABSTRACT

A system is provided for identifying at least one physical characteristic of items in a stream of items moving along a path through an inspection zone, and for separating items from the stream of items based upon the at least one physical characteristic. The system includes a movable transversely scanning mirror arranged to reflect electromagnetic energy from the inspection zone onto an array of detectors. The detectors of the array are arranged to sequentially receive electromagnetic energy so that on each transverse scan of the mirror for any given sub-zone within the inspection zone the detectors of the array receive electromagnetic energy reflected from the mirror at different times. The controller is then operable to correlate input signals from the various detectors corresponding to detected levels of electromagnetic energy received at different times from each given sub-zone within the inspection zone.

40 Claims, 10 Drawing Sheets

(56) References Cited

U.S. PATENT DOCUMENTS

| | | | | |
|---|---|---|---|---|
| 4,122,952 | A | 10/1978 | Richards | |
| 4,256,959 | A | 3/1981 | Monette | |
| 4,277,178 | A | 7/1981 | Cushing et al. | |
| 4,508,453 | A | 4/1985 | Hara et al. | |
| 4,522,497 | A | 6/1985 | Ikin | |
| 4,541,530 | A | 9/1985 | Kenny et al. | |
| 4,627,734 | A | 12/1986 | Rioux | |
| 4,634,881 | A | 1/1987 | Billion | |
| 4,656,517 | A | 4/1987 | Shida et al. | |
| 4,718,558 | A * | 1/1988 | Castaneda | 209/546 |
| 4,787,748 | A | 11/1988 | Rioux | |
| 4,900,146 | A | 2/1990 | Penney et al. | |
| 4,909,930 | A | 3/1990 | Cole | |
| 4,939,379 | A | 7/1990 | Horn | |
| 4,962,431 | A * | 10/1990 | Imakawa et al. | 358/296 |
| 5,004,929 | A | 4/1991 | Kakinoki et al. | |
| 5,011,960 | A | 4/1991 | Ando et al. | |
| 5,032,023 | A | 7/1991 | Schneiter | |
| 5,075,770 | A | 12/1991 | Smyth | |
| 5,088,828 | A | 2/1992 | Doemens et al. | |
| 5,105,149 | A | 4/1992 | Tokura | |
| 5,134,291 | A | 7/1992 | Ruhl, Jr. et al. | |
| 5,200,799 | A | 4/1993 | Maruyama et al. | |
| 5,260,576 | A | 11/1993 | Sommer, Jr. et al. | |
| 5,318,173 | A | 6/1994 | Datari | |
| 5,339,962 | A | 8/1994 | Sommer, Jr. et al. | |
| 5,419,438 | A * | 5/1995 | Squyres et al. | 209/3.1 |
| 5,555,984 | A | 9/1996 | Sommer, Jr. et al. | |
| 5,558,231 | A | 9/1996 | Weier | |
| 5,591,985 | A | 1/1997 | Tsuji et al. | |
| 5,615,778 | A | 4/1997 | Kaiser et al. | |
| 5,676,256 | A | 10/1997 | Kumar et al. | |
| 5,767,962 | A | 6/1998 | Suzuki et al. | |
| 5,770,864 | A | 6/1998 | Dlugos | |
| 5,794,788 | A | 8/1998 | Massen | |
| 5,808,305 | A | 9/1998 | Leidecker et al. | |
| 5,822,486 | A | 10/1998 | Svetkoff et al. | |
| 5,862,919 | A | 1/1999 | Eason | |
| 6,060,677 | A | 5/2000 | Ulrichsen et al. | |
| 6,068,106 | A | 5/2000 | Brizzi et al. | |
| 6,353,197 | B1 | 3/2002 | Ulrichsen et al. | |
| 6,497,324 | B1 * | 12/2002 | Doak et al. | 209/522 |
| 6,504,124 | B1 * | 1/2003 | Doak | 209/581 |
| 6,506,991 | B1 | 1/2003 | Eixelberger et al. | |
| 6,509,537 | B1 | 1/2003 | Krieg et al. | |
| 6,696,655 | B2 | 2/2004 | Harbeck et al. | |
| 6,734,383 | B1 | 5/2004 | Calcoen et al. | |
| 6,914,678 | B1 | 7/2005 | Ulrichsen et al. | |
| 7,113,272 | B2 | 9/2006 | Bourely et al. | |
| 7,173,709 | B2 | 2/2007 | Doak et al. | |
| 7,262,380 | B1 | 8/2007 | Ulrichsen et al. | |
| 7,858,893 | B1 * | 12/2010 | Haff et al. | 209/577 |
| 2006/0086794 | A1 | 4/2006 | Knowles et al. | |
| 2007/0086568 | A1 * | 4/2007 | Petzold et al. | 378/53 |
| 2007/0158245 | A1 * | 7/2007 | Kenny et al. | 209/576 |
| 2008/0302707 | A1 | 12/2008 | Bourely | |
| 2009/0032445 | A1 * | 2/2009 | Doak et al. | 209/587 |
| 2010/0108567 | A1 | 5/2010 | Medoff | |
| 2010/0126914 | A1 * | 5/2010 | Valerio | 209/20 |
| 2012/0037547 | A1 * | 2/2012 | McClain et al. | 209/645 |

FOREIGN PATENT DOCUMENTS

| | | | |
|---|---|---|---|
| DE | 8902911 | U1 | 8/1989 |
| DE | 4312915 | A1 | 10/1994 |
| DE | 9413671 | U1 | 1/1995 |
| EP | 0479756 | A2 | 4/1992 |
| EP | 0484221 | A2 | 5/1992 |
| EP | 0557738 | A1 | 9/1993 |
| FR | 2644250 | A3 | 9/1990 |
| JP | 58099736 | A | 6/1983 |
| JP | 03026052 | A | 2/1991 |
| JP | 5169037 | A | 7/1993 |
| JP | 11037723 | A | 2/1999 |
| SU | 1039591 | A | 9/1983 |
| WO | 8906782 | A1 | 7/1989 |
| WO | 9606689 | A2 | 3/1996 |
| WO | 9844335 | A1 | 10/1998 |

OTHER PUBLICATIONS

Exhibit A: Kobayashi et al., "High-Accuracy Polygon-Mirror of Automatic Surface Inspection Device", Toshiba Review (International Edition), Aug. 1972, pp. 24-28, No. 72.

Exhibit B: Masuda et al., "Automatic Calibration System for Polygon Mirrors", Precision Engineering, Jan. 1985, pp. 15-21, vol. 7, No. 1.

Exhibit C: "Optical Scanning Digitizers", Jan. 5, 1983 UTC United States English (United States), previously published in the SPI Database of Software Technologies, IEEE Computer, vol. 16, No. 5, pp. 15-25.

Exhibit D: "Multicolor Spatial Filtering for Information Processing", Jan. 11, 1970 UTC United States English (United States), Originally disclosed by IBM on Jan. 11, 1970 UTC, TDB 11-70, pp. 1454-1456.

Exhibit E: Vervaet et al., "Infrared process linescanner", Proceedings of the SPIE—The International Society for Optical Engineering, vol. 918, p. 11, 1988. Conference: Applications of Infrared Technology, Sponsor: SPIE, Instn. Production Eng., Jun. 9-10, 1988, London, UK.

Exhibit F: Yoshimura et al., "Development of scanning detection system for cracks on A1/sub 2/O/sub 3/ceramics", Japan Soc. of Precision Eng., Tokyo, Japan. Journal of the Japan Society of Precision Engineering, vol. 61, No. 11, pp. 1599-603, Publisher: Japan Soc. Precision Eng., Nov. 1995.

Exhibit G: Cao et al., "Research on the testing dividing error by using the polygon mirror", Source: Guangxue Jishu/Optical Technique, No. 1, Jan. 20, 1997, pp. 31-34. ISSN: 1002-1582 CODEN: GJISEP, Publisher: Optical Technique.

Exhibit H: Anon Source, "Laser Beam Inspection of Strip-Metal Surface Finish", Sheet Metal Industries, vol. 55, No. 11, Nov. 1978, pp. 1230-1231, 1244. ISSN: 0037-3435 CODEN: SHMIAR.

Exhibit I: Yoshimura et al., "Development of scanning detection system for cracks on A/203 ceramics", Source: Seimitsu Kogaku Kaishi/Journal of the Japan Society for Precision Engineering, vol. 61, No. 11, Nov. 1995, pp. 1599-1603. ISSN: 0912-0289 CODEN: SKKAEI, Publisher: JSPE.

* cited by examiner

Start of scan
Wavelength 0 Aligned with pixel 0

Wavelength 0 Aligned with pixel 1

Wavelength 0 Aligned with Pixel N-1

End of Scan
Wavelength M-1 Aligned with Pixel N-1

SEQUENTIAL SCANNING OF MULTIPLE WAVELENGTHS

BACKGROUND OF THE INVENTION

The present invention relates generally to sorting systems and to sensors for identifying material to be sorted.

SUMMARY OF THE INVENTION

A system for identifying at least one physical characteristic of items of a stream of items moving along a path through an inspection zone and for separating items from the stream of items based upon the at least one physical characteristic is provided. The system includes an array of ejectors arranged transversely across the path. The ejectors are constructed to eject selected items from the stream of items. An array of detectors, including at least a first detector and a second detector, is constructed to detect electromagnetic energy within first and second different wavelength ranges, respectively. A movable transversely scanning mirror is arranged to reflect electromagnetic energy from the inspection zone onto the array of detectors. The inspection zone includes a transverse array of sub-zones. The first and second detectors are arranged to sequentially receive electromagnetic energy so that on each transverse scan of the mirror, for any given sub-zone within the inspection zone, the first detector receives electromagnetic energy reflected from the mirror before the second detector receives electromagnetic energy reflected from the mirror. A controller is operably connected to the first and second detectors to receive input signals from the first and second detectors. The controller is also operably connected to the array of ejectors to send control signals to the ejectors. The controller is operable to correlate input signals from the first and second detectors corresponding to detected levels of electromagnetic energy received at different times from each given sub-zone within the inspection zone.

In another aspect of the invention the array of detectors and the scanning mirror are arranged so that at a point in time the first detector receives electromagnetic energy from a first location within the inspection zone and the second detector receives electromagnetic energy from a second location within the inspection zone, the second location being transversely offset from the first location.

In another aspect of the invention the array of detectors may include at least 10, or at least 15, or at least 20 detectors.

In another aspect of the invention first and second end point light sources are located in line with the array of detectors beyond opposite ends of the array of detectors. The end point light sources project light beams toward the scanning mirror so that the light from the end point light sources is reflected by the scanning mirror onto the inspection zone.

In another aspect of the invention a timer is associated with the end point light sources to synchronize an activation of the first and second end point light sources with a beginning and ending, respectively, of a transverse scan of the scanning mirror across the inspection zone.

In another aspect of the invention each detector of the array of detectors includes a photodiode and filter assembly. The array of detectors further includes a receiver block and a plurality of fiber optic cables, each cable having one end fixed in the receiver block and another end connected to one of the photodiode and filter assemblies.

In another aspect of the invention the scanning mirror has an axis of rotation, and the array of detectors is oriented relative to the scanning mirror with the array aligned at an offset angle to a plane normal to the axis of rotation of the mirror, so that movement of the stream of items along the path during a time interval between reception of electromagnetic energy by the first and second detectors from a given location within the inspection zone is mechanically accommodated by the offset angle.

In another aspect of the invention the offset angle is the angle whose tangent is equal to stream speed divided by scan speed, where the stream speed equals the speed at which the stream of items moves along the path, and the scan speed equals the speed at which a location viewed by each of the detectors moves across the inspection zone.

In another aspect, the array of detectors includes a receiver block and a plurality of fiber optic cables, each cable having one end fixed in the receiver block to provide a row of fiber ends.

In another aspect the controller is operable to control timing of input signals from the first and second detectors to coincide with transverse alignment of each detector with a given transverse location within the inspection zone.

In another aspect the controller includes a look up table containing triggering instructions for each detector corresponding to each transverse location within the inspection zone.

In another aspect the controller is operable to calculate the triggering instructions for the look up table based at least in part upon the physical geometry of the array of detectors, the scanning mirror and the arrangement of the array of detectors and the scanning mirror in relation to the inspection zone.

In another aspect the controller is operable to define the transverse array of sub-zones of the inspection zone, and the controller is operable to control the timing of the input signals from the multiple detectors associated with each of the sub-zones to accommodate the differing times required for the rotating mirror to scan different sub-zones due to an angular orientation of the rotating mirror relative to each sub-zone.

In another aspect the controller is operable to calculate triggering instructions for the first and second detectors.

In another aspect the controller is operable to save the input signals in a controller memory.

In another aspect the controller is operable to trigger multiple input signals from each one of the detectors for multiple overlapping locations during each scan of each sub-zone.

In another aspect the controller is operable to compute an average value of the multiple input signals from each one of the detectors for each scan of each sub-zone.

In another aspect the controller is operable to exclude a highest and a lowest of the multiple input signals from each one of the detectors for each scan of each sub-zone prior to computing the average value.

In another aspect the multiple input signals include from 8 to 64 input signals per detector per sub-zone.

In another aspect the first and second detectors are arranged such that at a point in time a first detector views a first location of the inspection zone having a first transverse width and a second detector views a second location of the inspection zone having a second transverse width, the first and second locations being separated by a transverse spacing.

In another aspect each input signal is an instantaneous voltage reading corresponding to an output of a photodiode associated with one of the detectors.

In another aspect each detector includes a fiber optic cable having an input end and an output end. A filter is connected to the output end of the fiber optic cable. The filter defines the wavelength range of its associated detector. A photodiode receives electromagnetic energy passing through the filter.

In another aspect each detector further includes an amplifier for amplifying an analog output from the photo diode, and an analog to digital converter for converting the amplified analog output to a digital input signal for the controller.

In another aspect a method is provided for identifying at least one physical characteristic of items in a stream of items moving along a path. The method includes the steps of:

(a) projecting electromagnetic energy toward an inspection zone of the path so that the projected energy falls upon the items moving through the zone;

(b) receiving at a plurality of detectors, electromagnetic energy from the items, the plurality of detectors including a first detector constructed to detect electromagnetic energy within a first wavelength range, and a second detector constructed to detect electromagnetic energy within a second wavelength range different from the first range, the first detector receiving its respective energy from a sub-zone of the inspection zone before the second detector receives its respective energy from the sub-zone;

(c) generating first and second data signals with the first and second detectors, respectively, representative of the electromagnetic energy received from the sub-zone; and (d) correlating the first and second data signals and utilizing the correlated data signals to identify the at least one physical characteristic of an item moving through the sub-zone of the inspection zone.

In another aspect of the method in step (b), at any moment in time the first detector views a first location in the inspection zone and the second detector views a second location in the inspection zone, the first and second locations being both longitudinally and transversely offset from each other.

In another aspect the method may further include projecting first and second end point light beams onto the scanning mirror, and synchronizing an activation of the end point light beams with the transverse scan of the scanning mirror across the inspection zone so that the first and second end point light beams illuminate end points of the transverse scan of the inspection zone.

In another aspect of the methods, the step (c) may include controlling timing of the generating of the first and second data signals, to coincide with transverse alignment of each of the first and second detectors with a given transverse location within the inspection zone.

In another aspect, the method may include generating a look up table of triggering instructions for each detector corresponding to each transverse location with the inspection zone, the triggering instructions being calculated at least in part based upon a physical geometry of the detectors and the scanning mirror in relation to the inspection zone.

In another aspect the method may include the saving of the data signals in a memory.

In another aspect the method may include generating multiple data signals from each of the detectors for each scan of each of the sub-zones.

In another aspect the method may include computing an average value of the multiple data signals from each one of the detectors for each scan of each sub-zone.

In another aspect the method may include excluding a highest and a lowest of the multiple data signals from each one of the detectors for each scan of each sub-zone prior to computing the average value.

In another aspect of the method the multiple data signals may include from 8 to 64 data signals.

In another aspect of the method each of the data signals may comprise an instantaneous voltage reading corresponding to an output of a photodiode associated with one of the detectors.

Numerous objects features and advantages of the present invention will be readily apparent to those skilled in the art upon a reading of the following disclosure when taken in conjunction with the accompanying drawings.

DETAILED DESCRIPTION

Figure 1:
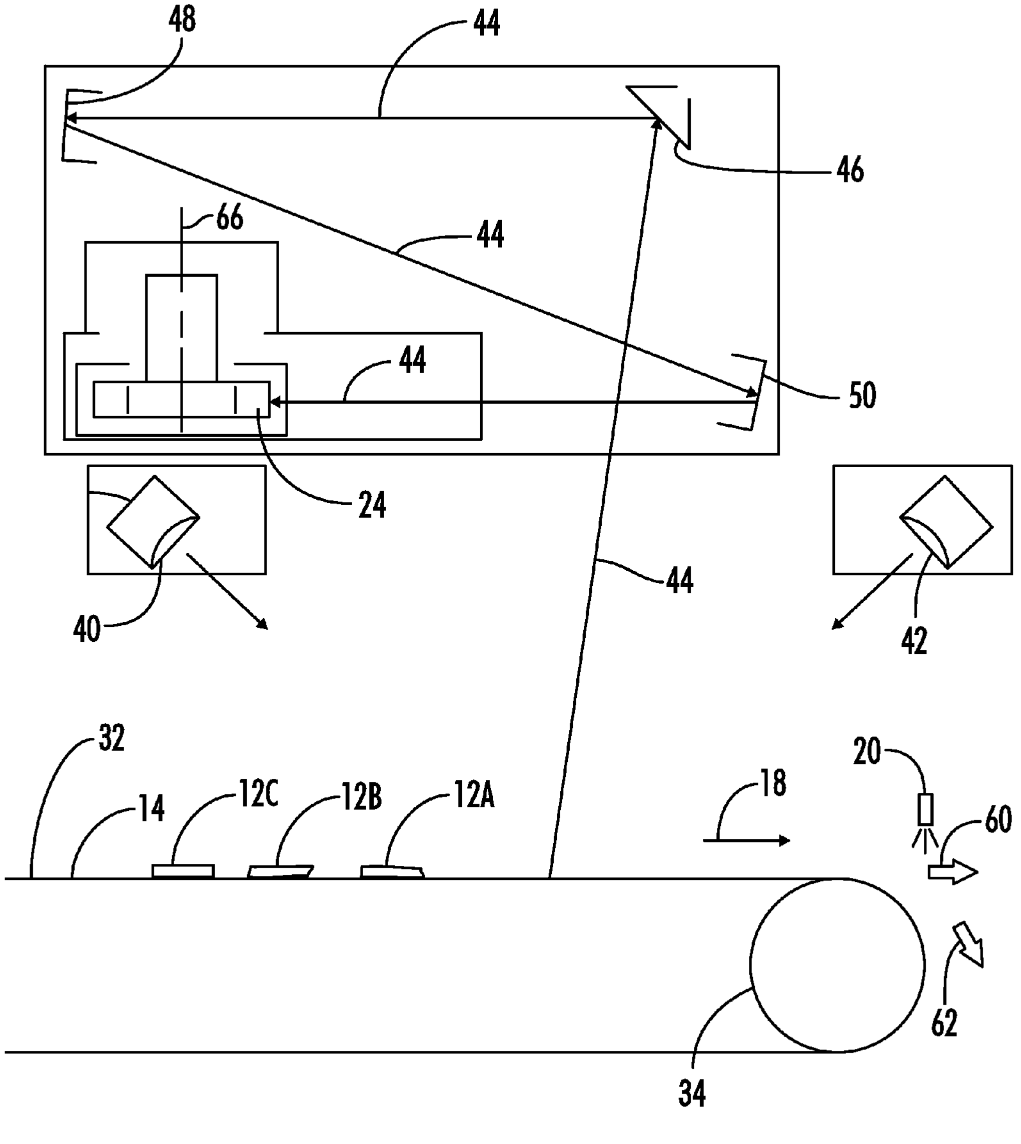
FIG. 1 is a schematic side elevation view of a sorting system including a scanning mirror sensor system.

FIGS. 1-4 schematically illustrate a system 10 for identifying at least one physical characteristic of a stream of items 12A, 12B, 12C, etc., moving along a path 14 through an inspection zone 16, and for separating items from the stream of items based upon the at least one physical characteristic identified by the system. The stream of items 12 moves along the path 14 in the direction 18.

An array of ejectors 20 is arranged transversely across the path 14 and includes multiple ejectors such as 20A, 20B, 20C, etc. The ejectors are constructed to eject selected ones of the items 12 from the stream of items.

An array of detectors 22 (see FIG. 3) including individual detectors 22A, 22B, 22C, etc. is constructed to detect electromagnetic energy within multiple different wavelength ranges.

Figure 2:
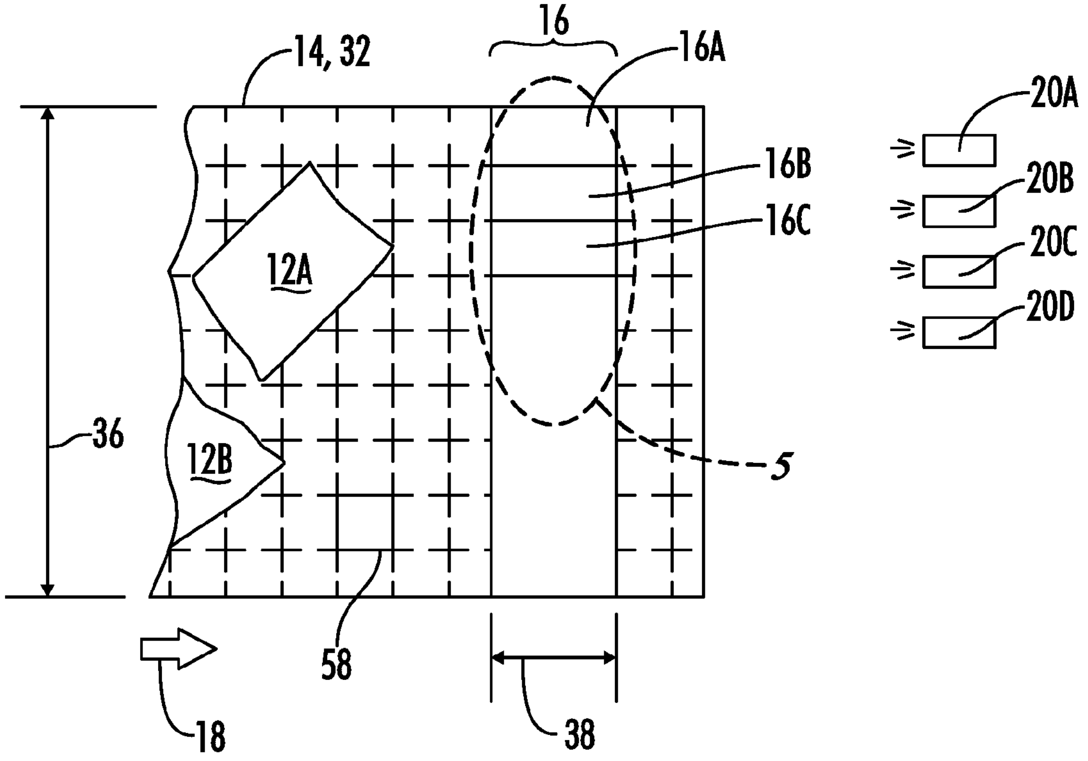
FIG. 2 is a schematic plan view of the conveyor and ejectors of the system of FIG. 1.

A movable transversely scanning mirror 24, in this example a rotatable scanning mirror 24, is arranged to reflect electromagnetic energy from the inspection zone 16 onto the array of detectors 22. Alternatively, an oscillating mirror may be used instead of a rotating mirror. As schematically illustrated in FIG. 2, the inspection zone 16 includes a transverse array of sub-zones such as 16A, 16B, 16C, etc.

As is further explained below the detectors such as for example the first and second detectors 22A and 22B in the array of detectors are arranged to sequentially receive electromagnetic energy so that on each transverse scan of the rotatable mirror 24 for any given sub-zone within the inspection zone 16, the first detector 22A receives electromagnetic energy reflected from the mirror 24 before the second detector 22B receives electromagnetic energy reflected from the mirror 24.

Figure 4:
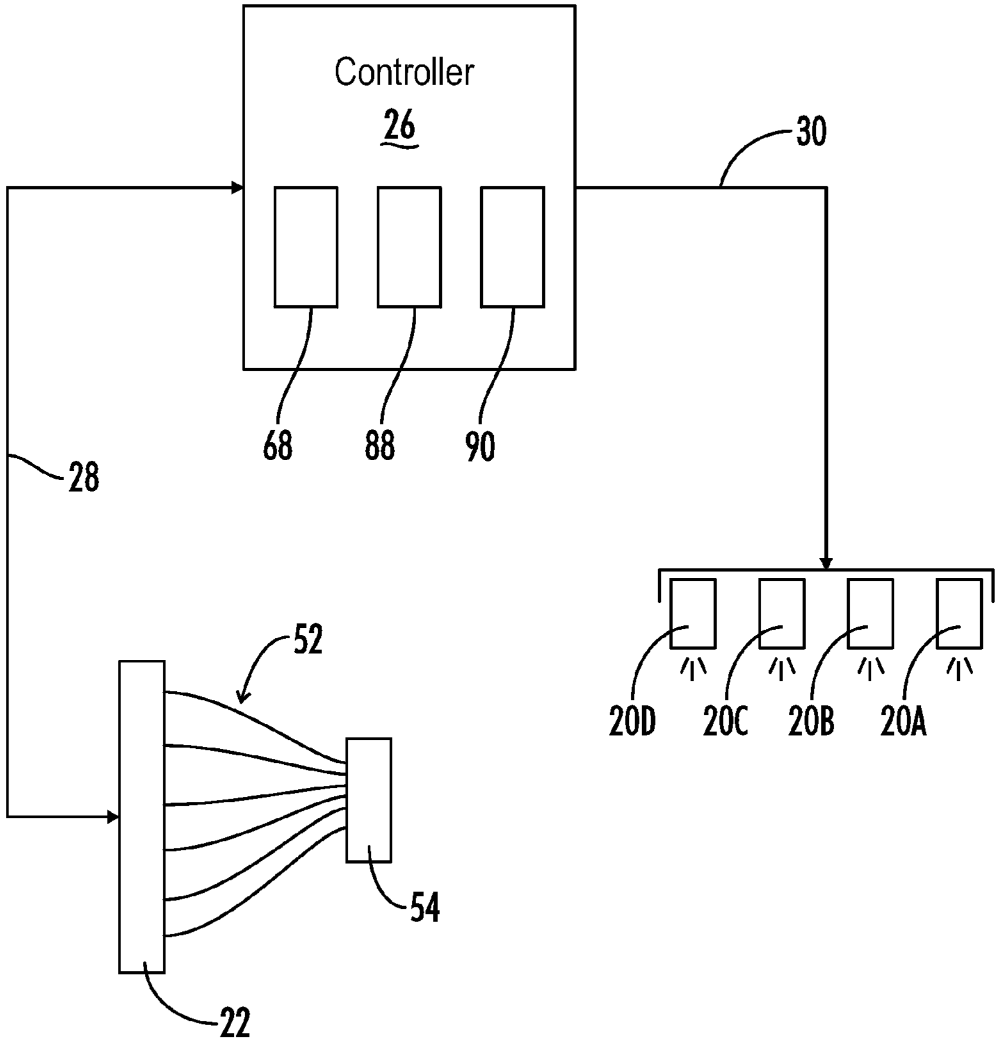
FIG. 4 is a schematic illustration representing the interconnection of the controller of the system of FIG. 1 with the various associated components.

As schematically illustrated in FIG. 4, a controller 26 is operably connected to the detectors such as 22A, 22B, etc. of the array of detectors 22 to receive input signals from the detectors 22 via communication line 28. The controller 26 is also operably connected to the ejectors such as 20A, 20B, 20C of the array of ejectors 20, to send control signals to the ejectors via a communication line 30. As is further explained below, the controller 26 is operable to correlate input signals from the detectors 22 corresponding to detected levels of electromagnetic energy received at different times from each given sub-zone such as 16A, 16B, 16C, etc. within the inspection zone 16.

Figure 3:
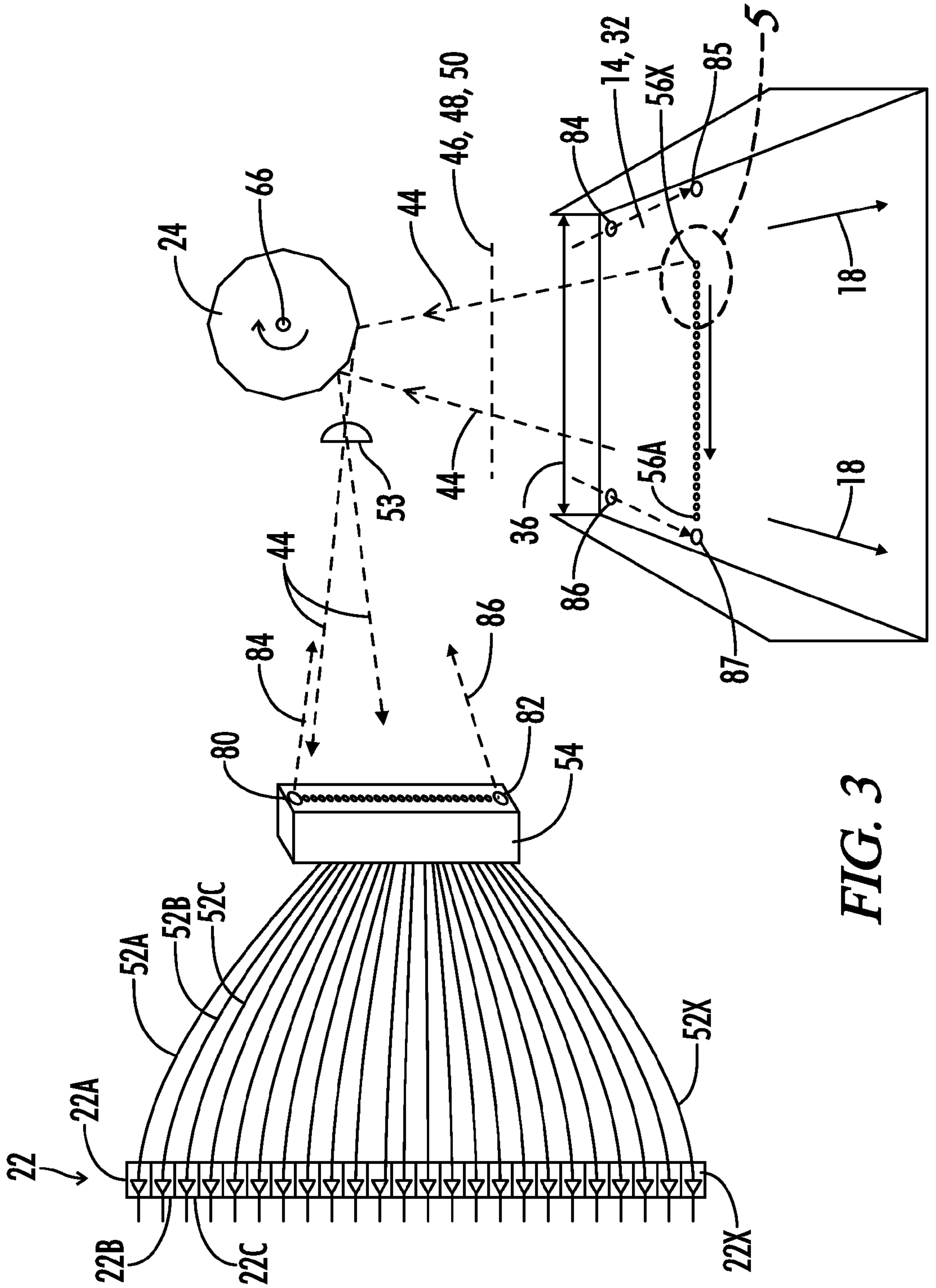
FIG. 3 is a schematic view of the system of FIG. 1 showing further details of the scanning mirror and the array of detectors.

The path 14 may for example be defined at least in part by an endless conveyor belt 32 carried on and driven by one or more rollers such as 34. In such an embodiment the path will have a width 36 as seen in FIGS. 2 and 3 with reference to such a path. Dimensions or directions parallel to the length of the path such as direction 18 will be referred to herein as longitudinal directions or dimensions, and dimensions or directions parallel to the width 36 of the path will be referred to herein as transverse dimensions or directions. Thus, the inspection zone 16 can be described as having a longitudinal length 38 and a transverse width 36.

The inspection zone 16 may be illuminated by first and second light sources such as 40 and 42. The light sources 40 and 42 may be broad spectrum light sources such as for example halogen lamps. Other electromagnetic energy sources, including but not limited to infrared and ultraviolet sources may also be used. Electromagnetic energy reflected or emitted from objects 12 within the inspection zone 16 follows a path such as schematically illustrated by energy path 44 in FIG. 1 to the rotating polygonal mirror 24. Along the path 44 the energy is reflected off of several intervening planar folding mirrors 46, 48 and 50.

In an alternative embodiment (not shown) the electromagnetic energy from sources such as 40 and 42 can be transmitted through objects and the sources and the rotating mirror can be located on opposite sides of the path 14. In such an embodiment the path 14 may be or include a slide having a window, or the path may include a projected path through the air so as to allow electromagnetic energy to be passed through the articles moving along the path.

FIG. 3 schematically illustrates the manner in which the rotating polygonal mirror 24 reflects electromagnetic energy from the inspection zone 16 to the array of detectors 22. In the particular embodiment illustrated in FIG. 3 the array 22 includes twenty-four detectors 22A-22X. Any one sub-zone such as sub-zone 16A of the detection zone 16 is viewed sequentially by the twenty-four detectors as the mirror 24 rotates to sweep the electromagnetic energy reflected or emitted from items in that sub-zone 16A across the row of twenty-four detectors 22A-22X.

The number of detectors 22 within the detector array may be selected depending upon the number of different wavelengths of electromagnetic energy which are needed to make the desired analysis to identify the materials of interest in the expected stream of articles to be separated. For example the array 22 in one embodiment may include at least ten detectors constructed to detect electromagnetic energy within at least ten different wavelength ranges, respectively. In another embodiment the array of detectors may include at least fifteen such detectors constructed to detect electromagnetic energy within at least fifteen different wavelength ranges, respectively. In another embodiment the array of detectors may include at least twenty detectors, constructed to detect electromagnetic energy within at least twenty different wavelength ranges, respectively.

Figure 5:
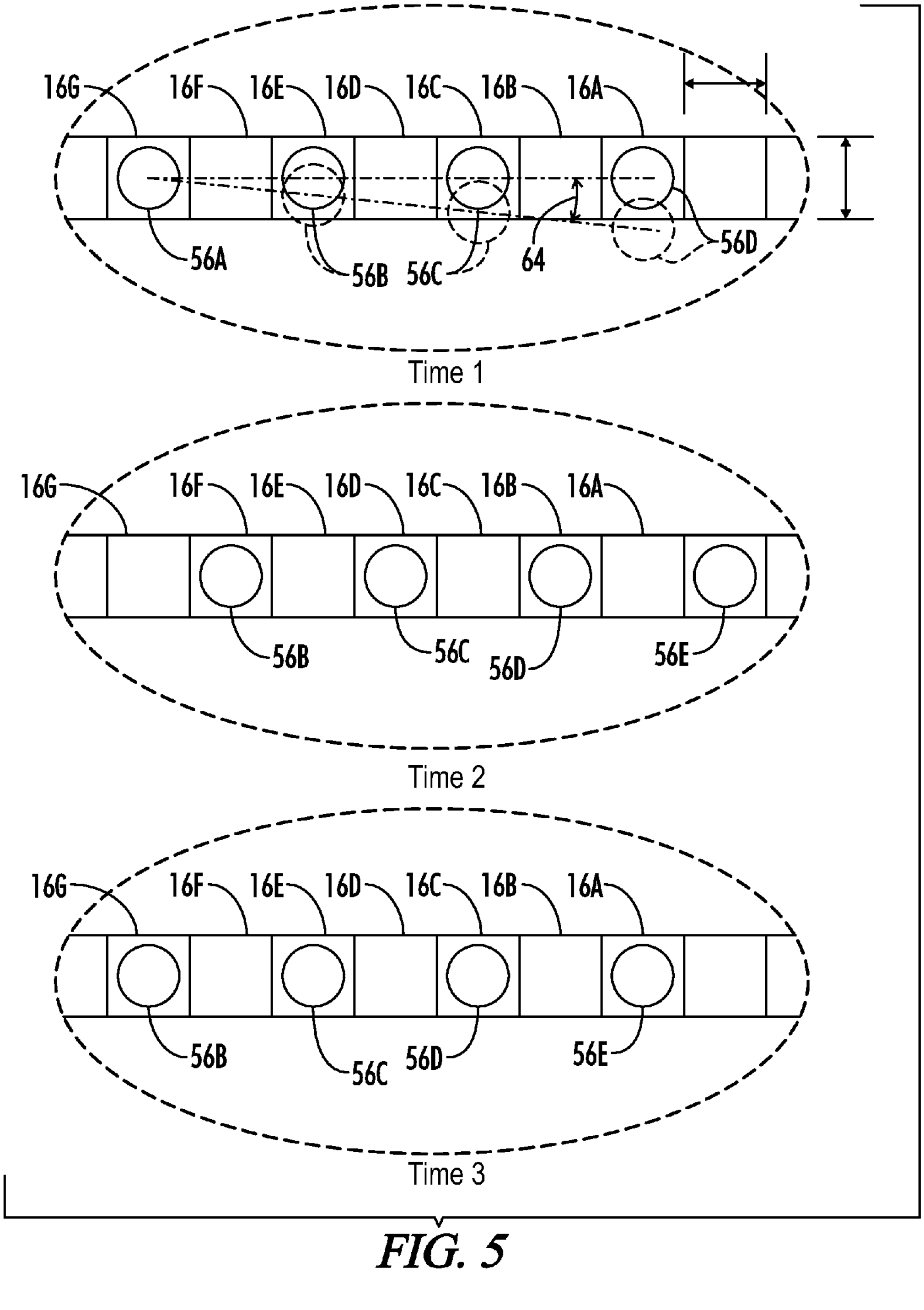
FIG. 5 is a series of schematic illustrations of the locations within the inspection zone viewed by the various detectors of the array of detectors at three sequential time periods of a transverse scan.

FIG. 5 provides several sequential enlarged schematic views of an area of the inspection zone 16 within an encircled area as indicated in FIGS. 2 and 3. The sequential illustrations of FIG. 5 illustrate the manner in which the locations viewed at any one time by the detectors of the detector array 22 sweep transversely across the sub-zones of the inspection zone 16.

As seen in FIG. 3, the electromagnetic energy following energy path 44 which is reflected or emitted from objects in the inspection zone 16 on the conveyor 32 is reflected by the rotating polygonal mirror 24 through an objective lens 53 and onto the ends of a series of fiber optic cables 52A-52X located in a receiver block 54. The other ends of the fiber optic cables 52 are connected to the detectors 22. Thus for any given position of the polygonal mirror 24, the ends of the twenty-four fiber optic cables 52 view twenty-four different locations which in this example comprise circular spots, 56A-56X arrayed widthwise across a portion of the inspection zone 16. It is noted that FIG. 3 is purely schematic and the positions and angles formed by the dotted energy or light rays 44 are not drawn to proper scale. For example at any one of the times as represented in FIG. 5, all of the rays 44 from the locations 56 would be reflected off a single facet of the polygonal mirror 24. Also, at any one time the twenty-four spots 56A-56X would occupy only a small portion of the width 36 of the conveyor 32.

Each of the twenty-four detectors 22A-22X is designed to pass and detect a different wavelength of the electromagnetic energy reflected or emitted from the detection zone 16.

As is best illustrated in FIG. 2, the items such as 12A, 12B and 12C within the stream of items moved along the path 14 by the conveyor 32 are preferably spread out into a layer of items substantially one item thick, so that the material making up each of the items can be identified and the items then separated by the system 10.

The items 12 are preferably carried by the conveyor 32 in a manner such that the items 12 are relatively fixed in their positions upon the conveyor 32. This may all be accomplished by material spreading and conveying systems such as for example those described in U.S. Pat. No. 6,250,472 assigned to the assignee of the present invention. The surface area on top of the conveyor 32 is broken down by the system 10 into a grid of longitudinally and transversely arrayed pixels such as represented by the dashed grid lines shown in FIG. 2, with a representative pixel being indicated as 58. It will be appreciated that typically each of the items 12 will occupy an area upon the conveyor 32 superimposed over a large number of the pixels 58.

The task of the system 10 through its collection and analysis of the electromagnetic energy reflected or emitted from objects 12 within the inspection zone 16 is to identify the material located at each pixel on the conveyor belt 32, which information is subsequently analyzed to determine the identity, size, shape, etc. of the items 12, and to then control the ejectors 20 at appropriate times so that the items 12 can be separated into a first product stream which follows the path indicated by the arrow 60 in FIG. 1 and a second product stream which may be thought of as the ejected stream which follows the path 62 indicated in FIG. 1.

As will be further described below, the location and size of each of the pixels 58 upon the conveyor 32 is an artificial imaginary construct of the inspection system 10 based upon the timing of the data collection by the system 10 from those various pixels or areas of the conveyor belt 32 as those pixels move through the inspection zone 16. In the embodiment illustrated, the dimensions of each pixel 58 have been selected to have a longitudinal dimension and a transverse dimension substantially equal to the longitudinal and transverse dimensions of the locations or spots 56 viewed by each of the individual detectors 22. As will also be further explained below, the inspection zone 16 may have a longitudinal dimension 38 which is greater than the longitudinal dimension of a pixel 58 or a location or spot 56, and in the specific embodiment illustrated the longitudinal dimension 38 of inspection zone 16 is equal to twice the longitudinal dimension of the locations 56 or pixels 58. The reason for this longitudinal dimension 38 of the inspection zone 16 being greater than the longitudinal dimensions of the locations 56 or pixels 58 is to allow for the longitudinal movement of the conveyor 32 which occurs during the time interval that it takes for the mirror 24 to scan the transverse width of the conveyor 32.

Typical dimensions for the pixels 58 and the locations or spots 56 may be on the order of approximately ¼ inch. Thus the dimensions of one of the pixels 58 may be ¼ inch×¼ inch. The dimensions of one of the approximately circular locations 56 viewed by one of the detectors 22 may have a diameter of approximately ¼ inch. Those dimensions can of course vary based upon the construction of the system, and pixel and location dimensions in the range of from ⅛ inch to ½ inch can readily be accommodated by the system 10.

In FIG. 5, three simplified schematic representations are provided of the viewing locations 56 of the detector array 22 relative to the sub-zones 16A, B, C, etc. of the inspection zone 16 at three sequential times during the data collection process. It will be appreciated that the actual data collection by the system 10 will be determined by a clocking portion of the controller 26, and thus the three times illustrated in FIG. 5 may correspond to three sequential clocking intervals. As will be further explained below, the data collection represented in FIG. 5 is simplified to represent only one data signal being collected for each detector corresponding to each sub-zone 16A, B, C, etc. of the detection zone 16. In reality, however, multiple data points will be collected and averaged to measure the electromagnetic energy received from a particular sub-zone such as 16A.

As shown in FIG. 5, at the times indicated each one of the locations such as 56A substantially occupies the transverse width of one of the sub-zones such as 16G of inspection zone 16.

The geometry of the system 10 and particularly the spacing of the optical fibers within receiver block 54 and their location and orientation relative to the mirror 24 and the inspection zone 16 have been selected such that at any given time the locations such as 56A and 56B viewed by two adjacent detectors such as 22A and 22B are separated by a transverse spacing having approximately the transverse width of one of the sub-zones or locations. Such transverse spacing may be more or less that the transverse width of one sub-zone; for example the spacing may range from about 0.5 to about 1.5 times the transverse width of one sub-zone. As is further explained below with regard to FIG. 8, there is actually some small difference in the transverse widths of adjacent viewing locations or spots 56A and 56B due to the geometry of the system, and those differences will be accommodated in the timing of the data collection associated with each of the sub-zones such as 16A of the inspection zone.

In the example illustrated in FIG. 5, the locations viewed by the detectors 22 as indicated by the locations 56A, 56B, 56C, etc. will move from right to left relative to the fixed positions of the sub-zones such as 16A, 16B, 16C, etc. of the inspection zone 16. Thus at the time illustrated as time 1 in FIG. 5, which is a very early stage of a scan, detector 22A is viewing location 56A which is positioned transversely within sub-zone 16G, detector 22B is viewing location 56B which is positioned in sub-zone 16E, detector 22C is viewing location 56C located within sub-zone 16C, and detector 22D is viewing location 56D located within sub-zone 16A.

At time 2, the polygonal mirror 24 has rotated a sufficient amount that each of the viewing locations 56 has shifted to the left approximately the transverse width of one sub-zone such as 16A. Thus at time 2, the second detector 22B is viewing location 56B which is positioned within sub-zone 16F, the detector 22C is viewing location 56C which is positioned within sub-zone 16D, and the detector 22D is viewing location 56D which is positioned within sub-zone 16B.

Then at time 3, detector 22B is viewing location 56B which is positioned within sub-zone 16G, detector 22C is viewing location 56C which is positioned within sub-zone 16E, detector 22D is viewing location 56D which is positioned within sub-zone 16C, and detector 22E is viewing location 56E which is positioned within sub-zone 16A.

Thus as the polygonal mirror 24 rotates, the series of locations or spots 56 sweeps across the width of the conveyor 32. The data detection from the detectors 22 is being clocked so that data is collected for each sub-zone such as 16A of the detection zone 16 as that sub-zone is traversed by each of the locations or viewing spots associated with one of the detectors such as 22A.

Thus in the example shown in FIG. 3 having twenty-four detectors 22A-22X, for any one sub-zone such as 16A a sequential series of detection events occurs at twenty-four different times separated by time intervals. For example at a first detection event the first detector 22A will view the sub-zone 16G as illustrated at Time 1 in FIG. 5 and will detect one wavelength of reflected electromagnetic energy as determined by the construction of the first detector 22A.

At a second detection event as illustrated at Time 3 in FIG. 5 the second detector 22B will view that same sub-zone 16G and detect a second wavelength of reflected electromagnetic energy. In order to analyze the data and make an identification of the nature of the material comprising the item 12 which is actually located at sub-zone 16G within the inspection zone 16, the data from the twenty-four different detection events associated with each of the detectors 22A-22X sequentially viewing the item 12 located in sub-zone 16G requires that the data from the twenty-four different detection events occurring at twenty-four different times must be correlated and compared by the controller 26 which receives and analyzes that data. Also, due to the spacing between the viewing locations, a total of at least forty-seven clocking periods will elapse during the time it takes to detect the twenty-four different detection events associated with the twenty-four detectors 22A-22X viewing any one of the sub-zones such as 16G.

It is understood that the positions represented at Times 1, 2 and 3 in FIG. 5 are snapshots of the positions of the viewing locations or spots 56 in the middle of a clocking interval; the spots are actually constantly moving and multiple readings will actually be made as a spot moves across a sub-zone such as 16G. Furthermore it is noted that for any one time interval such as Time 1 the detections of electromagnetic energy reflected from the twenty-four spots 56A-56X do not all occur exactly simultaneously. This is due to the geometry of the optical system in which the various spots are viewed at different angles, as is further described below with regard to FIG. 8.

Another level is added to the complexity of the data collection and correlation due to the fact that during the time that it takes for the twenty-four viewing spots 56A-56X to scan across one of the sub-zones such as 16G of the inspection zone, the conveyor 32 will actually have moved the articles 12 some distance in the longitudinal direction. Thus, with the locations 56 shown in solid lines in the simplified drawings of FIG. 5, the successive detectors in the array would not be viewing exactly the same portion of the article 12 that happens to be passing through the sub-zone 16G of the inspection zone during the time interval required for those twenty-four viewing spots to scan across the sub-zone 16G. One way this can be dealt with is to mechanically accommodate this movement by orienting the array of detectors 22 relative to the scanning member so that the line of viewing locations 56A-56X viewed at any one point in time by the array of detectors 22 is skewed at an angle 64 as schematically shown in the Time 1 representation of FIG. 5 in phantom lines.

This can be accomplished as follows. The rotating polygonal mirror 24 has an axis of rotation 66 as seen in FIGS. 1 and 3. The array of detectors, and particularly the array of the ends of the fibers 52 as mounted in the receiver block 54 is oriented relative to the scanning mirror 24 with the array of fiber ends aligned at an offset angle 64 to a plane normal to the axis of rotation 66 of the mirror 24, which angle will be reflected upon the inspection zone 16 as the angle 64 by which the viewing spots 56 are skewed relative to the transverse width of the conveyor. The actual location of the viewing spots 56A, 56B, 56C, 56D along the offset angle 64 are shown in dashed lines for Time 1 of FIG. 5.

As illustrated in above in FIG. 5 with reference to "Time 1", due to the angle 64 at which the receiver block 54 is placed, adjacent detectors such as 22A and 22B view first and second locations within the detection zone 16, such as locations 56A and 56B (see dashed line location of 56B), which first and second locations are both longitudinally and transversely offset from each other. This allows the movement of the stream of items 12 along the path 14 during a time interval between reception of electromagnetic energy by the successive detectors of the detector array 22 to be mechanically accommodated by the offset angle 64. Thus, in the time between Times 1 and 3 illustrated in FIG. 5, while the viewing spot 56B moves from sub-zone 16E to sub-zone 16G, the articles 12 will have moved by a longitudinal distance equal to the longitudinal offset between viewing spots 56A and 56B. Thus the actual portion of an article 12 viewed by the second detector 22B at Time 3 at sub-zone 16G will be the same portion of the article 12 that was viewed by the first detector 22A at sub-zone 16G at Time 1.

It will be further apparent that the angle 64 is the angle whose tangent is equal to the stream speed divided by the scan speed, where the stream speed equals the speed at which the stream of items 12 moves along the path 14 in the longitudinal direction 18, and the scan speed equals the speed at which a location such as location 56A viewed by a detector moves transversely across the inspection zone.

Additionally, it is preferable that more than one measurement of electromagnetic energy detected by each detector such as 22A be taken for each of the sub-zones such as 16G. Thus, in the preferred embodiment rather than taking a single measurement of the electromagnetic energy received by detector 22A when it is viewing location 56A within sub-zone 16G, it is preferable to measure multiple input signals from each one of the detectors for multiple overlapping locations as that detector's viewing location scans across each sub-zone such as 16G. There may be from 8 to 64 input signals measured at from 8 to 64 overlapping locations as one viewing location such as 56A scans across the transverse width of one sub-zone such as 16G.

Exemplary Dimensions

Exemplary dimensions and speeds for the system 10 in one example may be as follows. For a conveyor width 36 equal to 64 inches, and for a pixel size 58 of ¼ inch×¼ inch and a viewing location 56 diameter of ¼ inch, there will be 256 pixels and thus 256 sub-zones of inspection zone 16 arrayed in a row across the width 36 of the conveyor. For a twenty-four wavelength detector system 22, there are then 6,144 timing events which must be determined if only a single measurement is taken for each detector as it crosses each sub-zone.

Then when the multiple readings for each detector at each sub-zone are figured in, the number of timing events for a single transverse scan of the mirror across the width of the conveyor is multiplied by the number of readings desired for each detector at each sub-zone. Thus if 8 readings are to be taken for each detector at each sub-zone, 8×6,144 timing events must be calculated which equals to 49,152 timing events. If 64 measurements are desired to be taken for each detector as it crosses each sub-zone, 64×6,144 or 393,216 timing events must be determined for each transverse scan of the rotating mirror across the conveyor.

In one embodiment the belt speed in the direction 18 and the scanning speed of the rotating mirror are selected so that as the mirror scans the width 36 of the conveyor, the conveyor moves longitudinally a distance equal to the longitudinal length of one pixel, or in the example stated above, ¼ inch. Thus in the example given, for a 64 inch wide belt, the rotating mirror scans the 64 inch width while the conveyor moves longitudinally ¼ inch and thus the offset angle 64 is the angle whose tangent is equal to ¼ divided by 64 or 0.00391.

Thus if the mirror 24 rotates at a speed of 2,500 rpm, and if the mirror has 8 facets, the transverse scan speed is 106,667 feet per minute for a 64 inch wide belt. The belt speed or conveyor speed in the direction 18 would be 5,000 inches per minute or 416 feet per minute. Thus, a single transverse scan of the belt would occur approximately every 0.003 seconds. During each scan as noted above there will be anywhere from 49,152 to 393,216 measurement events which must be timed.

Calculation of Detection Timing

FIGS. 6A-6E schematically illustrate the method of calculating the timing for each of the measurement events. As previously noted, because of the geometry of the system, each of the 256 sub-zones of inspection zone 16 lies at a different angle from the rotating mirror 24 and thus the viewing locations 56A, 56B, etc. for each of the detectors 22A, 22B, etc. for a given detection sub-zone occur with varying time delays as the mirror scans across the width of the conveyor.

Figure 6A:
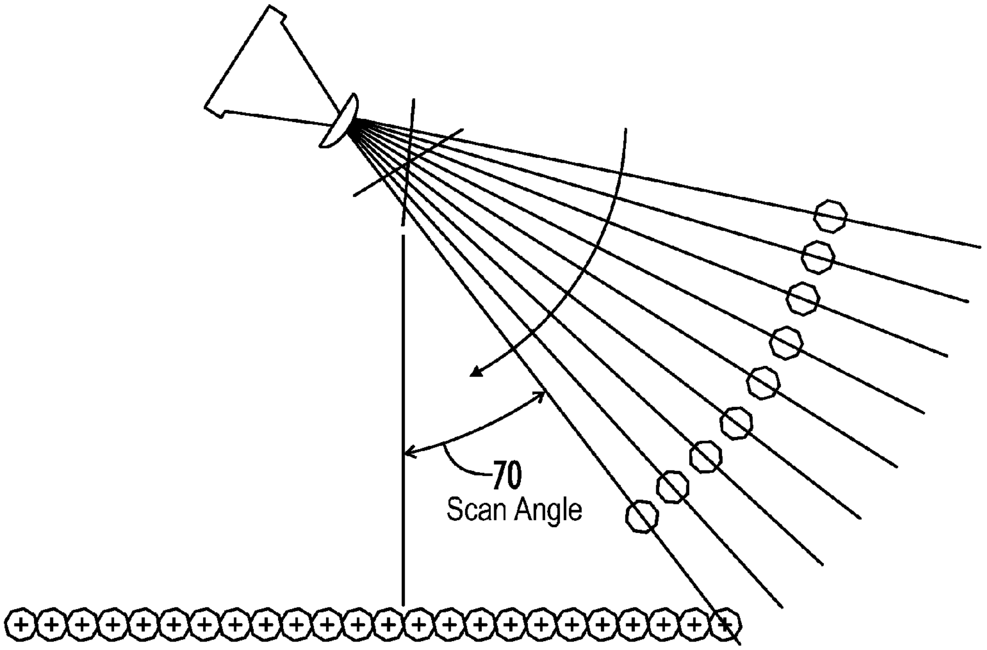
FIGS. 6A-6E comprise a sequential series of schematic illustrations showing the manner of determination of the appropriate timing for the input signals from the various detectors.
Figure 6B:
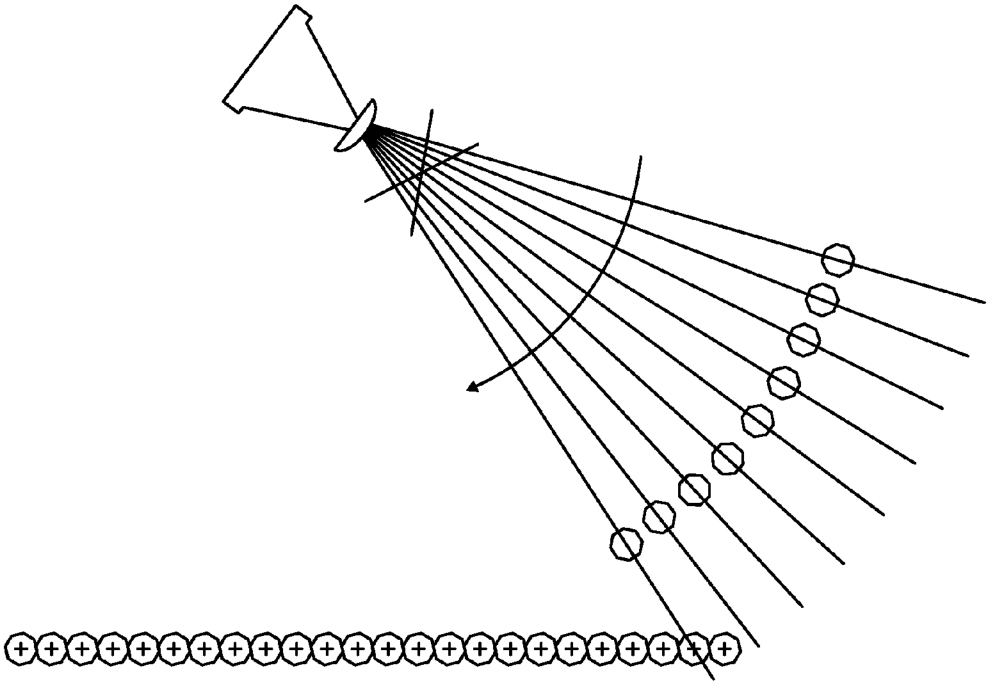
Figure 6C:
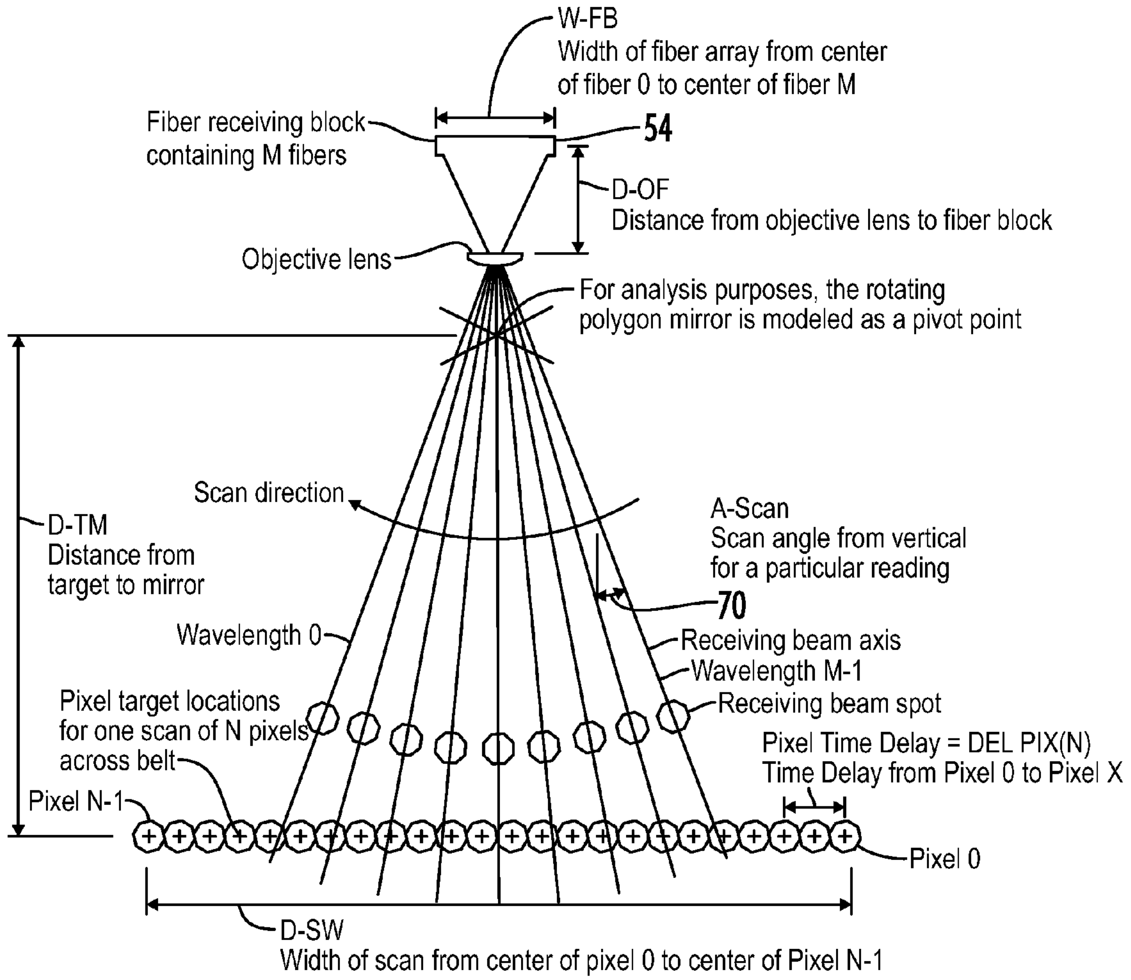
Figure 6D:
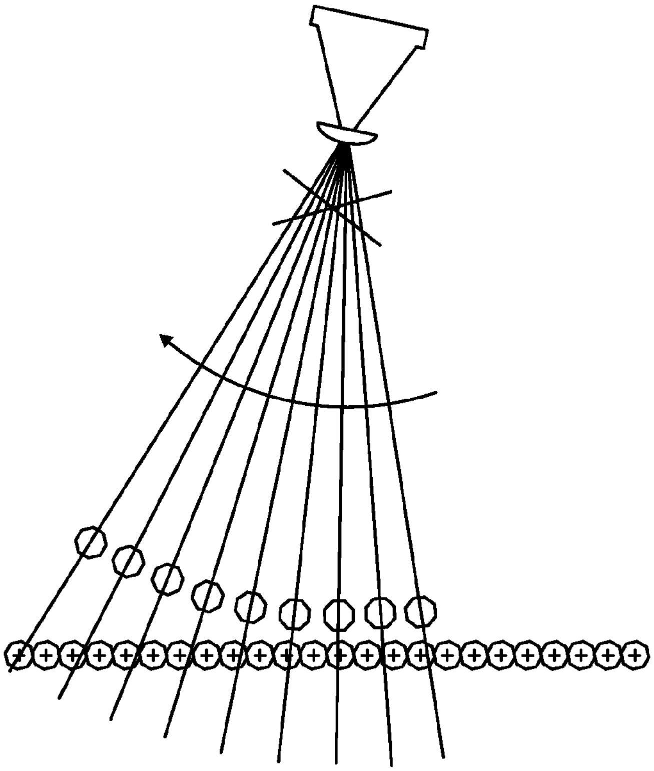
Figure 6E:
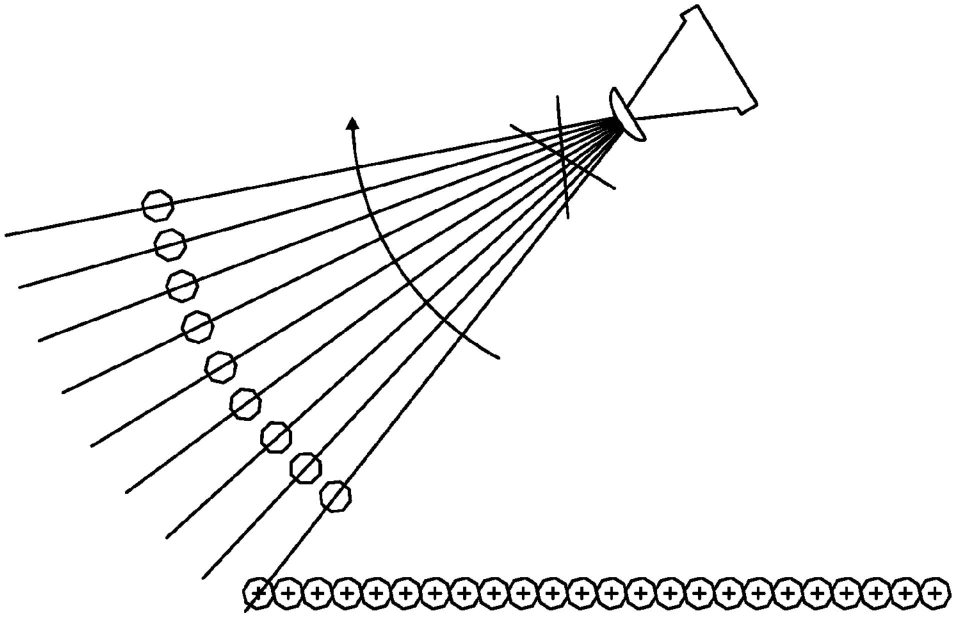

FIGS. 6A-6E schematically illustrate the geometry of the receiving block 54 relative to the various sub-zones of the inspection zone 16 during a single scan across the width 36 of belt 32. FIG. 6A schematically illustrates the viewing orientation of the detector array relative to the inspection zone at the beginning of a scan. In FIG. 6B the wavelength 0 for the first detector 22A is aligned with the second sub-zone which would be sub-zone 16B. In FIG. 6C, the mirror 24 (not shown) is oriented such that a centermost one of the detectors 22 within the receiving block 18 is viewing a centermost, sub-zone of the inspection zone 16 at the middle of the width 36 of the conveyor during the mid-point of a scan. In FIG. 6D the wavelength 0 detector (detector 22A) is aligned with pixel N−1 at some intermediate location during the scan. In FIG. 6E at the end of the scan the wavelength N−1 detector (22X) is aligned with pixel N−1.

FIGS. 6A-6E help illustrate the manner in which the system 10 and particularly the controller 26 thereof calculates the timing for each of the data signals to be measured by each of the detectors 22 for each of the sub-zones of the inspection zone 16.

For the system illustrated in FIGS. 6A-6E, a reading time or reading location is defined as the time delay from the start of scan shown in FIG. 6A where wavelength 0 is aligned with sub-zone 16A. In the example illustrated in FIGS. 6-8, references to a wavelength 0 correspond to the wavelength of sensor 22A. References to pixel 0 correspond to sub-zone 16A, pixel 1 corresponds to sub-zone 16B, etc. The delay information is stored in a look up table 68 (see FIG. 8) and the time delay information from the look up table is used to trigger the operation of each of the detectors to take a data signal from that detector corresponding to the electromagnetic energy of the chosen wavelength received from the item located within the sub-zone at that point in time.

For the series of readings to be taken by one detector such as 22A at its selected wavelength for each of the successive sub-zones of the detection zone 16, a series of time delays from one sub-zone to the next are calculated. Where the number of sub-zones across the width of the conveyor is N, there are N−1 delays for a complete scan. These sub-zone to sub-zone delays will then be used to calculate total delay from the start of scan for a given measurement.

First the time delays are calculated for wavelength 0 associated with detector 22A. Then the same delays are used for subsequent wavelengths associated with the subsequent detectors 22B, 22C, etc. by adding an offset delay. The offset is proportional to the angle between the successive receiving beams as defined by the receiving block and lens geometry.

In order to produce an equally spaced array of sub-zones 16A, 16B, 16C, etc. for the inspection zone 16, the time delays between each sub-zone reading for a given wavelength sensor must be proportional to the cosine of the scan angle 70 as illustrated in FIG. 6A for a particular reading. Because of this the time delays between adjacent sub-zones are shorter near the outer edges of the scan and longer in the center of the scan.

Figure 7:
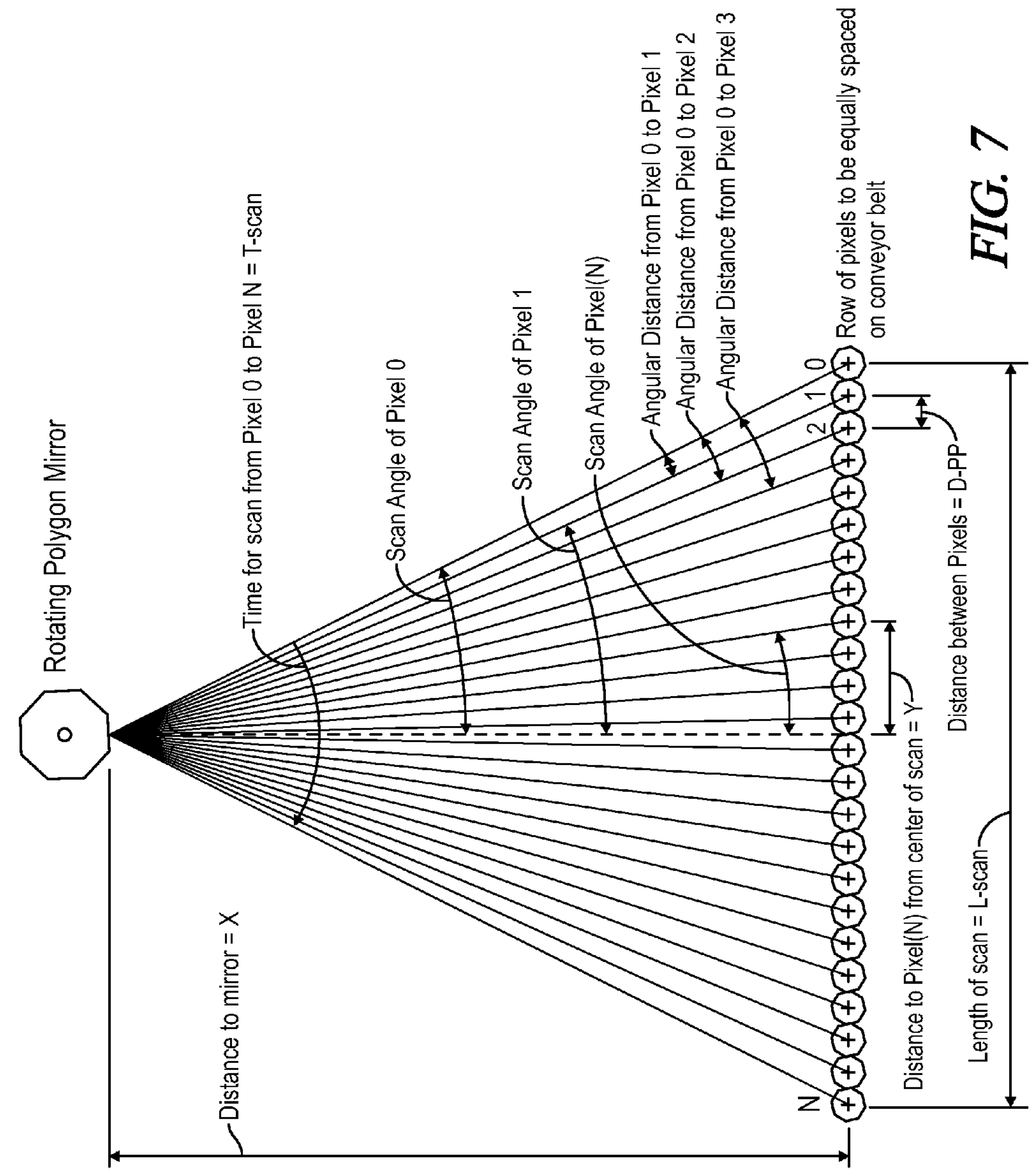
FIG. 7 is a schematic illustration identifying the geometrical parameters used to calculate the timing for the sensor readings corresponding to the successive sub-zones of the inspection zone.

FIG. 7 further illustrates the manner of calculation of the transverse locations of each of the sub-zones of inspection zone 16 which may also be referred to as transverse pixel locations because they correspond to the locations of the array of pixels across the width of the conveyor 32.

Given the length of scan equal L-SCAN and the number of pixels equal N, the distance from the scan center to each pixel is equal to Y. Then, given X=the distance from the belt to the mirror, the scan angle for each sub-zone or pixel is calculated as:

$$\text{scan angle}=\arctan(Y/X).$$

Then, the angular location of each sub-zone or pixel 1, 2, 3 . . . N from pixel 0 is computed as:

$$\text{scan angle}(0)-\text{scan angle}(N)=\text{angular distance from pixel 0}.$$

Then, the angular location of each pixel can be converted to a time delay location from pixel 0. This is provided by the formula:

$$\text{time delay}(N)=\text{total scan time}*[\text{angular location}(N)/\text{total scan angle}],$$

where $$\text{total scan angle}=2*\arctan(0.5*L\text{-SCAN}/X)$$

Via the formulas given or similar geometric relationships, the controller 26 is programmed so that it is operable to calculate the triggering instructions for the look up table 68 at least in part based upon the physical geometry of the array 22 of detectors, the scanning mirror 24, and the arrangement of the array of detectors 22 and the scanning mirror 24 in relation to the inspection zone 16. In this manner, the controller 26 is operable to define the transverse array of sub-zones of the inspection zone 16. Also the controller 26 is operable to control the timing of the input signals from the various detectors associated with each of the sub-zones to accommodate the differing times required for the rotating mirror 24 to scan different sub-zones due to an angular orientation of the rotating mirror 24 relative to each sub-zone as represented by the scan angle 70 shown in FIGS. 6 and 7.

Implementation of Detection Timing

The time location of pixel 0 is determined by a synchronization signal received from the rotating mirror 24 via the control system 26. During operation, pixel 0 is read first after reception of the synchronization signal. Then, subsequent pixels are read at the calculated time after pixel 0. The result is an equally spaced row of sub-zones or pixels across the width of the conveyor belt.

Figure 8:
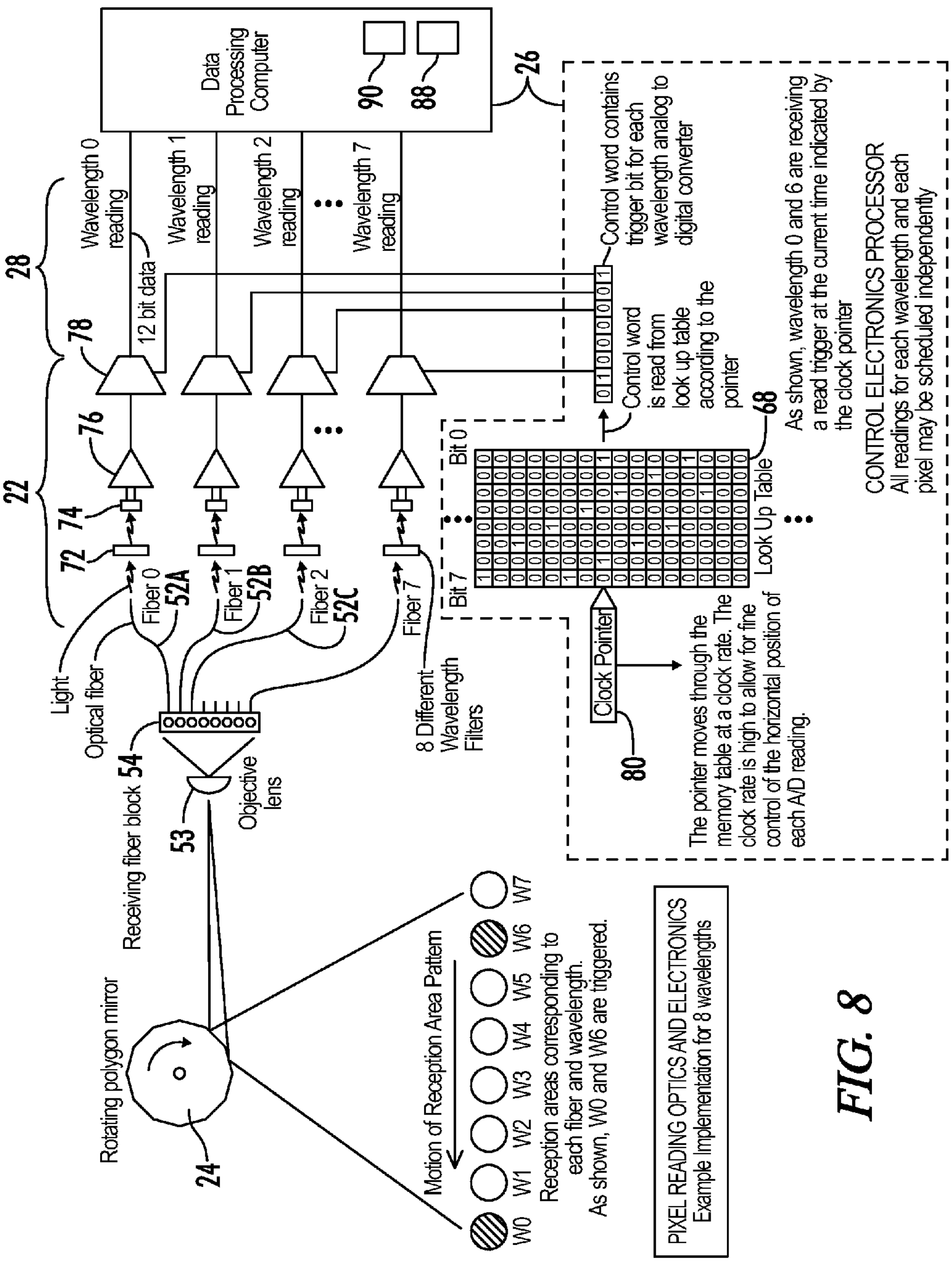
FIG. 8 is a schematic illustration of the manner in which the controller triggers the input signals from each of the detectors.

Referring now to FIG. 8, a schematic illustration is there provided showing the manner in which the time delays corresponding to the desired timing for triggering of a reading from each sensor corresponding to each sub-zone is stored and then looked up during the scanning process.

For simplicity of illustration, the example shown in FIG. 8 only illustrates the use of a total of eight wavelengths corresponding to eight sensors. It will be understood that any number of sensors may be included in the sensor array 22 as previously discussed.

As is seen in FIG. 8, each of the detectors of detector array 22 includes a filter 72, a photodiode detector 74, an amplifier 76 for amplifying an analog output from the photodiode 74, and an analog to digital converter 78 for converting the amplified analog output to a digital input signal for the controller 26.

Each input signal preferably is an instantaneous voltage reading corresponding to an output of the photodiode 74 associated with one of the detectors of detector array 22. It will be understood that it is the filters 72 which define the wavelength range of their associated detectors 22.

The controller 26 communicates with the detector array 22 over the communication lines 28 to receive detection signals from the detectors, and also to control the triggering of the detectors to generate the energy intensity readings at the various wavelengths. The signals received by controller 26 from the detectors of detector array 22 may be described as data signals representative of the electromagnetic energy received by the detectors from the associated sub-zones or locations on the inspection zone 26.

The data signals received by controller 26 from the detectors 22 may be saved in a memory 90 of the controller 26 as a table of values corresponding to the measured energy intensity at each wavelength for each of the sub-zones of the inspection zone 16.

The controller 26 controls the timing of the generation of those data signals to coincide with the desired alignment of the various detectors with the various transverse locations within the inspection zone. This is accomplished via the look up table 68 which is defined within the controller 36. As previously noted, the various locations across the width of the inspection zone 16 are defined as time delays starting from the beginning of the scan across the width of the inspection zone. Those time delays are stored within the look up table 68 to identify the desired timing for each of the many thousands of detection events that occur during each scan across the inspection zone.

The look up table 68 as schematically illustrated in FIG. 8 has a number of columns horizontally corresponding to the number of detectors in the detector array 22. For the example shown in FIG. 8 there are eight detectors and thus eight columns in look up table 68. For the example previously described with regard to FIG. 3 having twenty-four detectors in the detector array 24, there would be twenty-four columns in the look up table 68.

The horizontal rows within the table each correspond to a time. The controller 26 will have a clock associated therewith defining a clock rate of the controller. For example, using a 50 megahertz clock, readings can be placed in time with a resolution of 20 nSec. As a scan begins across the inspection zone 16 a clock pointer 80 within the controller 26 moves down the table 68 from row to row. The total time for the pointer to move from the top to the bottom of the look up table 68 will correspond to the time required for a single scan across the width of the inspection zone 16. Thus each row within the look up table 68 will correspond to a particular location across the width of the inspection zone 16. At each of the times corresponding to one of the rows of the look up table 68, there is a binary control word written in the look up table 68. For example the row pointed to by the clock pointer 80 in FIG. 8 indicates by the numeral 1 in the column corresponding to bit 0 and bit 6 that the sensors 22A corresponding to bit 0 and 22G corresponding to bit 6 are to be triggered so that a reading is transmitted at that time from each of the two designated detectors to the control system 26.

As previously noted, the controller 26 is operable to trigger multiple input signals from each of the detectors of detector array 22 for multiple overlapping locations as each detector scans each of the sub-zones. As previously noted, anywhere from eight to sixty-four different input signals may be triggered for each detector as it scans each sub-zone.

Correlation of the Data

The controller is also operable to correlate the input signals from the various detectors corresponding to detected levels of electromagnetic energy received at different times from each sub-zone of the inspection zone and thus from a given pixel 58 in the stream of material flowing through the inspection zone. The controller is operable to store those input signals from the detectors in memory 90, and then correlate all of the signals corresponding to a given pixel 58 of the material in the stream of items 12 flowing through the inspection zone, and to use that data to calculate values of the various wavelengths of electromagnetic energy received from a given pixel 58 in the stream of material. For example, the controller 26 may be operable to exclude a highest and a lowest of the multiple input signals from each of the detectors for each scan of each sub-zone prior to computing an average value of those input signals, to thus arrive at a more accurate measurement of the intensity of electromagnetic energy received at the detector from a given pixel 58 of the material in the stream of materials than would be expected if for example only a single input signal measurement were taken for each such pixel.

The correlation of the data is a data grouping task. The object of this procedure for each scan across the conveyor is to produce an array of pixel data objects numbered sequentially from 0 to N−1 (N=number of pixels), where each pixel data object comprises a collection of discreet wavelength readings. The wavelengths are numbered 0 to W−1 (W=number of wavelengths). In the example described above there are twenty-four wavelengths, so W=24 in that example. This pixel data is then ready for analysis to determine the type of material on the conveyor belt.

As described, the A/D converters 78 and controller 26 operate to produce readings at a number of different wavelengths from the inspection sub-zones 16A, 16B, etc. Those sub-zones correspond to belt pixel locations such as 58. Due the non-simultaneous reading nature of the system, the data for each wavelength in each pixel or sub-zone does not arrive in the memory 90 at the same time. They do arrive in the correct order of scan. The data for wavelength 0 is first, the data for wavelength W−1 is last.

The data from the A/D converters is first stored in number arrays in memory arranged by wavelength, as it is produced. There are 24 such arrays. By the end of a scan cycle, when the last wavelength reading W−1 for the last pixel N−1 has been read, these arrays are complete. After this point, analysis can proceed.

The arrangement of the data by wavelength may be as shown in the following Table I:

TABLE I

| Data Arranged By Wavelength |
|---|
| Wavelength 0 readings: 0, 1, 2, 3, 4 . . . N−1 |
| Wavelength 1 readings: 0, 1, 2, 3, 4 . . . N−1 |
| Wavelength 2 readings: 0, 1, 2, 3, 4 . . . N−1 |
| Wavelength 3 readings: 0, 1, 2, 3, 4 . . . N−1 |
| . |
| . |
| . |
| Wavelength W−1 readings: 0, 1, 2, 3, 4 . . . N−1 |

It is then a matter of array manipulation to re-order the data by pixel. The data is in reality a table of wavelength vs. pixel. The arrangement of the data by pixel may be as shown in the following Table II

TABLE II

| Data Arranged By Pixel |
|---|
| Pixel 0: |
| Reflectivity reading at wavelength 0 |
| Reflectivity reading at wavelength 1 |
| Reflectivity reading at wavelength 2 |
| . |
| . |
| . |
| Reflectivity reading at wavelength W−1 |
| Pixel 1: |
| Reflectivity reading at wavelength 0 |
| Reflectivity reading at wavelength 1 |
| Reflectivity reading at wavelength 2 |
| . |
| . |
| . |
| Reflectivity reading at wavelength W−1 |
| Pixel 2: |
| Reflectivity reading at wavelength 0 |
| Reflectivity reading at wavelength 1 |
| Reflectivity reading at wavelength 2 |
| . |
| . |
| . |
| Reflectivity reading at wavelength W−1 |
| . |
| . |
| . |
| Pixel N−1: |
| Reflectivity reading at wavelength 0 |
| Reflectivity reading at wavelength 1 |
| Reflectivity reading at wavelength 2 |
| . |
| . |
| . |
| Reflectivity reading at wavelength W−1 |

The data can then be analyzed to determine the material properties of the item 12 located at each pixel on the conveyor. It will be appreciated that many different physical characteristics of the items 12 may be determined depending upon the types and wavelengths of electromagnetic energy which are detected by the detectors. For example, such systems may identify the color of the items, the material from which the items are made, the presence of printed matter on the items, and other physical characteristics. Such systems may identify various types of items such as office paper, old corrugated cardboard, magazines, newspaper, various container types, various plastic materials, various glass materials, various metal materials, various types of electronic recycled components, and others. Numerous examples of the use of various wavelengths of reflected or emitted electromagnetic energy to identify various material properties are shown in U.S. Pat. Nos. 7,816,616 and 7,019,822, both assigned to the present invention, the details of which are incorporated herein by reference.

Endpoint Detection

One optional feature which may be utilized with the system 10 is a synchronization system which aids in properly aligning the rotating mirror 24 with the inspection zone 16. This synchronization system may include first and second endpoint light sources 80 and 82 as schematically illustrated in FIG. 3 located in the receiver block 54 in line with the ends of the fiber optic cables 52 defining the array of detectors, with the endpoint light sources 80 and 82 being located beyond opposite ends of the array of detectors. The endpoint light sources 80 and 82 project light beams 84 and 86 back toward the scanning mirror 24 so that light from the endpoint sources 80 and 82 is reflected by the scanning mirror 24 back onto the inspection zone 16 to create end point spots 85 and 87 (see FIG. 3) at the ends of the scan of the width of the conveyor. The controller 26 includes a timer 88 associated with the endpoint light sources 80 and 82 to synchronize activation of the endpoint light sources 80 and 82 with a beginning and ending respectively of a transverse scan of a scanning mirror across the width of the inspection zone 16. This timing creates the spots 85 and 87 on the conveyor 32. The physical orientation of the various components may then be adjusted so that the spots 85 and 87 fall at the appropriate locations on the conveyor 32. The timer 88 may be associated with an extension of the look up table 68 including triggering instructions for the endpoint light sources 80 and 82.

SUMMARY OF METHODS OF THE INVENTION

The present invention provides methods of identifying at least one physical characteristic of items such as items 12 in a stream of items moving along a path 14. The method includes projecting electromagnetic energy such as from sources 40 and 42 toward the inspection zone 16 of the path 14 so that the projected energy falls on items such as 12A, 12B, etc. moving through the inspection zone 16. Electromagnetic energy reflected or emitted from the items 12, as transmitted via the energy path 44, is received at the plurality of detectors 22. The first detector 22A of detector array 22 receives its respective reflected or emitted energy from a sub-zone of the inspection zone 16 before the second detector 22B receives its respective reflected or emitted energy from that particular sub-zone.

The system 10 generates data signals representative of the electromagnetic energy received at the respective detectors from the sub-zones. The timing of those data signals is controlled by the use of look-up table 68. The controller 26 stores the data signals in memory 90 and then correlates the multiple data signals and utilizes the correlated data signals to identify at least one physical characteristic of the items moving through the sub-zone of the inspection zone.

Thus, although there have been described particular embodiments of the present invention of a new and useful Sequential Scanning Of Multiple Wavelengths it is not intended that such descriptions be construed as limitations upon the scope of this invention except as set forth in the following claims.

What is claimed is:

1. A system for identifying at least one physical characteristic of items in a stream of items moving along a path through an inspection zone and for separating items from the stream of items based upon the at least one physical characteristic, the system comprising:

an array of ejectors arranged transversely across the path, the ejectors being constructed to eject selected items from the stream of items;

an array of detectors, including at least a first detector and a second detector constructed to detect electromagnetic energy within first and second different wavelength ranges, respectively;

a movable transversely scanning mirror arranged to reflect electromagnetic energy from the inspection zone onto the array of detectors, the inspection zone including a transverse array of sub-zones, the first and second detectors being arranged to sequentially receive electromagnetic energy so that on each transverse scan of the mirror for any given sub-zone within the inspection zone the first detector receives electromagnetic energy reflected from the mirror before the second detector receives electromagnetic energy reflected from the mirror; and a controller operably connected to the first and second detectors to receive input signals from the first and second detectors and operably connected to the array of ejectors to send control signals to the ejectors, the controller being operable to correlate input signals from the first and second detectors corresponding to detected levels of electromagnetic energy received at different times from each given sub-zone within the inspection zone.

2. The system of claim 1, wherein:

the array of detectors and the scanning mirror are arranged so that at a point in time the first detector receives electromagnetic energy from a first location within the inspection zone and the second detector receives electromagnetic energy from a second location within the inspection zone, the second location being transversely offset from the first location.

3. The system of claim 1, wherein:

the array of detectors includes at least ten detectors, constructed to detect electromagnetic energy within at least ten different wavelength ranges, respectively, the at least ten detectors including the first and second detectors.

4. The system of claim 1, wherein:

the array of detectors includes at least fifteen detectors, constructed to detect electromagnetic energy within at least fifteen different wavelength ranges, respectively, the at least fifteen detectors including the first and second detectors.

5. The system of claim 1, wherein:

the array of detectors includes at least twenty detectors, constructed to detect electromagnetic energy within at least twenty different wavelength ranges, respectively, the at least twenty detectors including the first and second detectors.

6. The system of claim 1, further comprising:

first and second end point light sources located in line with the array of detectors beyond opposite ends of the array of detectors, the end point light sources projecting light beams toward the scanning mirror so that light from the end point light sources is reflected by the scanning mirror onto the inspection zone.

7. The system of claim 6, further comprising:

a timer associated with the end point light sources to synchronize an activation of the first and second end point light sources with a beginning and ending, respectively, of a transverse scan of the scanning mirror across the inspection zone.

8. The system of claim 1, wherein the array of detectors further comprises:

each detector including a photodiode and filter assembly;

a receiver block; and a plurality of fiber optic cables, each cable having one end fixed in the receiver block and another end connected to one of the photodiode and filter assemblies.

9. The system of claim 1, wherein:

the scanning mirror has an axis of rotation; and the array of detectors is oriented relative to the scanning mirror with the array aligned at an offset angle to a plane normal to the axis of rotation of the mirror, so that movement of the stream of items along the path during a time interval between reception of electromagnetic energy by the first and second detectors from a given location within the inspection zone is mechanically accommodated by the offset angle.

10. The system of claim 9, wherein:

$$\text{the offset angle} = \arctan\frac{\text{stream speed}}{\text{scan speed}};$$

where stream speed equals the speed at which the stream of items moves along the path, and scan speed equals the speed at which a location viewed by each of the detectors moves across the inspection zone.

11. The system of claim 9, wherein:

the array of detectors includes a receiver block and a plurality of fiber optic cables, each cable having one end fixed in the receiver block to provide a row of fiber ends.

12. The system of claim 1, wherein:

the controller is operable to control timing of input signals from the first and second detectors to coincide with transverse alignment of each detector with a given transverse location within the inspection zone.

13. The system of claim 1, wherein:

the controller includes a look up table containing triggering instructions for each detector corresponding to each transverse location within the inspection zone.

14. The system of claim 13, wherein:

the controller is operable to calculate the triggering instructions for the look-up table based at least in part upon the physical geometry of the array of detectors, the scanning mirror and the arrangement of the array of detectors and the scanning mirror in relation to the inspection zone.

15. The system of claim 1, wherein:

the controller is operable to define the transverse array of sub-zones of the inspection zone; and the controller is operable to control the timing of the input signals from the first and second detectors associated with each of the sub-zones to accommodate the differing times required for the rotating mirror to scan different sub-zones due to an angular orientation of the rotating mirror relative to each sub-zone.

16. The system of claim 15, wherein:

the controller is operable to calculate triggering instructions for the first and second detectors.

17. The system of claim 15, wherein:

the controller is operable to save the input signals in a controller memory.

18. The system of claim 15, wherein:

the controller is operable to trigger multiple input signals from each one of the detectors for multiple overlapping locations during each scan of each sub-zone.

19. The system of claim 18, wherein:

the controller is operable to compute an average value of the multiple input signals from each one of the detectors for each scan of each sub-zone.

20. The system of claim 19, wherein:

the controller is operable to exclude a highest and a lowest of the multiple input signals from each one of the detectors for each scan of each sub-zone prior to computing the average value.

21. The system of claim 18, wherein:

said multiple input signals include from 8 to 64 input signals.

22. The system of claim 1, wherein:

the first and second detectors are arranged such that at a point in time the first detector views a first location of the inspection zone having a first transverse width and the second detector views a second location of the inspection zone having a second transverse width, the first and second locations being separated by a transverse spacing.

23. The system of claim 1, wherein:

each input signal is an instantaneous voltage reading corresponding to an output of a photodiode associated with one of the detectors.

24. The system of claim 1, wherein each detector comprises:

a fiber optic cable having an input end and an output end;

a filter connected to the output end of the fiber optic cable, the filter defining the wavelength range of its associated detector; and a photodiode receiving electromagnetic energy passing through the filter.

25. The system of claim 24, wherein each detector further comprises:

an amplifier for amplifying an analog output from the photodiode; and an analog-to-digital converter for converting the amplified analog output to a digital input signal for the controller.

26. A method of identifying at least one physical characteristic of items in a stream of items moving along a path, comprising:

(a) projecting electromagnetic energy toward an inspection zone of the path so that the projected energy falls upon the items moving through the zone;

(b) receiving at a plurality of detectors, electromagnetic energy from the items, the plurality of detectors including a first detector constructed to detect electromagnetic energy within a first wavelength range, and a second detector constructed to detect electromagnetic energy within a second wavelength range different from the first range, the first detector receiving its respective energy from a sub-zone of the inspection zone before the second detector receives its respective energy from the sub-zone;

(c) generating first and second data signals with the first and second detectors, respectively, representative of the electromagnetic energy received from the sub-zone; and (d) correlating the first and second data signals and utilizing the correlated data signals to identify the at least one physical characteristic of an item moving through the sub-zone of the inspection zone.

27. The method of claim 26, wherein:

in step (b), at any moment in time the first detector views a first location in the inspection zone and the second detector views a second location in the detection zone, the first and second locations being both longitudinally and transversely offset from each other.

28. The method of claim 27, wherein:

the inspection zone includes a transverse array of adjacent equal transverse width sub-zones; and the first and second locations are spaced apart by a transverse spacing.

29. The method of claim 26, wherein:

in step (b) the plurality of detectors includes at least ten detectors constructed to detect electromagnetic energy within at least ten different wavelength ranges, respectively, the at least ten detectors including the first and second detectors.

30. The method of claim 26, wherein:

in step (b) the plurality of detectors includes at least fifteen detectors constructed to detect electromagnetic energy within at least fifteen different wavelength ranges, respectively, the at least fifteen detectors including the first and second detectors.

31. The method of claim 26, wherein:

in step (b) the plurality of detectors includes at least twenty detectors constructed to detect electromagnetic energy within at least twenty different wavelength ranges, respectively, the at least twenty detectors including the first and second detectors.

32. The method of claim 26, further comprising:

projecting first and second end point light beams onto the scanning mirror; and synchronizing an activation of the end point light beams with the transverse scan of the scanning mirror across the inspection zone so that the first and second end point light beams illuminate end points of the transverse scan of the inspection zone.

33. The method of claim 26, wherein:

step (c) further comprises controlling timing of the generating of the first and second data signals, to coincide with transverse alignment of each of the first and second detectors with a given transverse location within the inspection zone.

34. The method of claim 33, further comprising:

generating a look-up table of triggering instructions for each detector corresponding to each transverse location within the inspection zone, the triggering instructions being calculated at least in part based upon a physical geometry of the detectors and the scanning mirror in relation to the inspection zone.

35. The method of claim 26, further comprising:

saving the data signals in a memory.

36. The method of claim 26, wherein:

step (c) further comprises generating multiple data signals from each of the detectors for each scan of each of the sub-zones.

37. The method of claim 36, further comprising:

computing an average value of the multiple data signals from each one of the detectors for each scan of each sub-zone.

38. The method of claim 37, further comprising:

excluding a highest and a lowest of the multiple data signals from each one of the detectors for each scan of each sub-zone prior to computing the average value.

39. The method of claim 36, wherein:

said multiple data signals include from 8 to 64 data signals.

40. The method of claim 26, wherein:

in step (c) each of the data signals comprises an instantaneous voltage reading corresponding to an output of a photodiode associated with one of the detectors.

* * * * *